No. 715,028. Patented Dec. 2, 1902.
D. J. CUMMINGS.
REMOVABLE HORSESHOE PAD.
(Application filed Apr. 11, 1902.)
(No Model.)
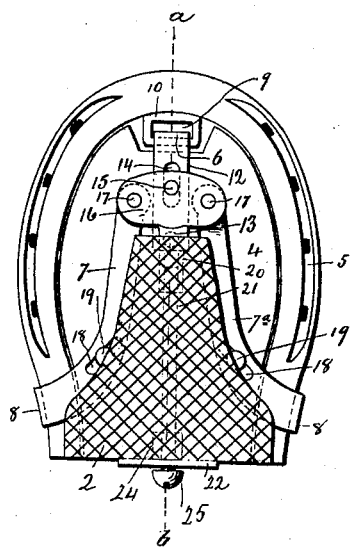
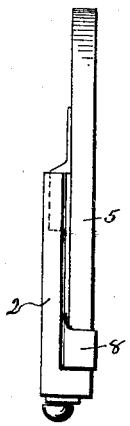
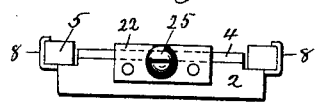
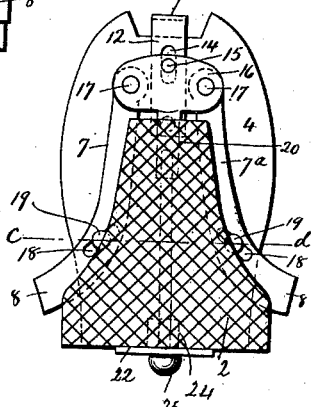
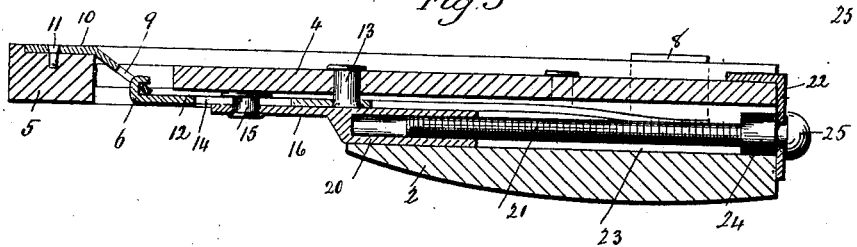
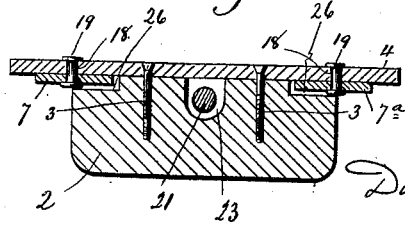
Witnesses
Daniel J. Cummings
Inventor
By Atty Seymour & Earle

UNITED STATES PATENT OFFICE.

DANIEL J. CUMMINGS, OF NEW HAVEN, CONNECTICUT.

REMOVABLE HORSESHOE-PAD.

SPECIFICATION forming part of Letters Patent No. 715,028, dated December 2, 1902.

Application filed April 11, 1902. Serial No. 102,346. (No model.)

*To all whom it may concern:*

Be it known that I, DANIEL J. CUMMINGS, of New Haven, in the county of New Haven and State of Connecticut, have invented a new and useful Improvement in Removable Horseshoe-Pads; and I do hereby declare the following, when taken in connection with the accompanying drawings and the letters of reference marked thereon, to be a full, clear, and exact description of the same, and which said drawings constitute part of this specification, and represent, in—

Figure 1, a reverse plan view of a horseshoe having my improved removable pad applied to it; Fig. 2, an edge view of the shoe and removable pad; Fig. 3, a rear view thereof; Fig. 4, a reverse plan view of the removable pad shown as disconnected from the horseshoe; Fig. 5, an enlarged view, in longitudinal section, on the line $a\ b$ of Fig. 1; Fig. 6, an enlarged view, in transverse section, on the line $c\ d$ of Fig. 4.

My invention relates to an improvement in removable horseshoe-pads, the object being to produce a simple, durable, and effective device constructed with particular reference to convenience of application and removal to and from horseshoes.

With these ends in view my invention consists in a removable horseshoe-pad having certain details of construction and combinations of parts, as will be hereinafter described, and pointed out in the claims.

In carrying out my invention as herein shown I employ a thick wedge-shaped pad 2, made of rubber or equivalent material and preferably having its lower face cross-hatched or in some way roughened, so as to adapt it to take hold of slippery surfaces of whatever character. This pad is secured by long screws 3 or other suitable means to a flexible plate 4, made of rubber, leather, or equivalent material and adapted in shape to fit snugly within a horseshoe.

It is designed to supply the article to the trade each with its plate 4 large enough to be cut down to fit any ordinary horseshoe in which it keeps the device in place, for which reason I shall hereinafter speak of this plate 4 as the "locating-plate."

The device is removably applied to a horseshoe 5 by means of a flat hook 6 and a pair of bowed clamping-arms 7 and 7ª, these arms having their outer ends bent upward and inward to form gripping-fingers 8, which grip the outer edges of the ends of the horseshoe, as shown in Fig. 3. The hook 6 aforesaid is adapted to be passed through an eye 9, formed in the projecting rear or inner end of a small plate 10, secured by rivets 11 or otherwise to the center of the upper face of the horseshoe, as clearly shown in Fig. 5. The hook 6 has a flat rearwardly-extending shank 12, the extreme rear end of which is perforated for the reception of a rivet 13, by which it is secured to the locating-plate 4. The said shank 12 is also formed with a long slot 14 for the reception of a headed guiding-stud 15, mounted in the upper face of a coupling-head 16, to the opposite ends of which the forward ends of the clamping-arms 7 and 7ª are pivotally secured by means of studs 17 17. The said arms are formed with inclined operating-slots 18 18, receiving operating-studs 19 19, mounted in the locating-plate 4. The coupling-head 16 aforesaid is formed with an internally-threaded rearwardly-extending tubular operating-stem 20, receiving an operating-screw 21, mounted at its rear end in a plate 22, secured to the rear end of the pad 2, the upper face of which is formed with a groove 23 for the reception of the said screw, which is held against longitudinal movement in the plate 22 by means of a shoulder 24, bearing against the inner face of the plate, and by means of the slotted head 25, bearing against the outer face of the plate. By reference to Fig. 6 it will be seen that the upper edges of the pad 2 are cut away or rabbeted at 26, so as to provide clearance for the clamping-arms 7 and 7ª.

When the operating-screw 21 is turned from left to right by the insertion of a screwdriver into its slotted head 25, the coupling-head 16 will be drawn rearwardly with respect to the locating-plate 4, whereby the arms 7 and 7ª will be drawn rearwardly and at the same time forced outwardly and spread apart by the action of the operating-slots 18 and the operating-studs 19. This adjusts the device for application to a horseshoe through the eye 9 of the plate 10, of which the hook 6 is now passed. Then by an upward swinging movement of the rear end of the device (it swings upon the hook 6 as upon a pivot)

the upwardly-bent fingers 8 of the arms 7 and 7ᵃ are brought into position to grip the outer edges of the rear ends of the horseshoe. The operating-screw is now turned from right to left, whereby the coupling-head 16 is positively moved forward, carrying the clamping-arms 7 and 7ᵃ with it. As they move forward the operating-studs 19 act upon the side walls of the operating-slots 18 of the arms to draw the arms inward until they are solidly clamped upon the outer edges of the horseshoe, to which my device is now firmly secured beyond any chance of accidental displacement. When it is desired to remove the device, it is only necessary to turn the operating-screw from left to right, whereby the coupling-head 16 is drawn back, bringing with it the clamping-arms, which are at the same time spread apart, and thus released from the horseshoe, after which the device will swing downward at its rear end into position to have its forward end readily unhooked.

My improved horseshoe-pad is so readily removed from a horseshoe and so readily applied thereto that it will only be used when the horses are being driven and removed as soon as they are brought in, thus avoiding the objection of having the horses stand in the pads and avoiding the wearing of the pads in the stable. The pads proper may be replaced whenever they become worn and any part of the device may be easily repaired if it gets out of order.

It is apparent that in carrying out my invention some changes from the structure herein shown and described may be made, and I would therefore have it understood that I do not limit myself thereto, but hold myself at liberty to make such departures therefrom as fairly fall within the spirit and scope of my invention.

Having fully described my invention, what I claim as new, and desire to secure by Letters Patent, is—

1. In a removable horseshoe-pad, the combination with a pad proper, of a locating-plate having the pad connected to it and adapted to fit within a horseshoe, a hook adapted to be engaged with the forward end of the horseshoe, two clamping-arms adapted at their rear ends to be engaged with the outer edges of the rear ends of the horseshoe and connected with the locating-plate so as to be drawn together or spread apart when moved back and forth relative thereto, and means for so moving the said arms.

2. In a removable horseshoe-pad, the combination with a pad proper, of a locating-plate having the said pad connected with it and adapted to fit within a horseshoe, a hook connected with the said plate and adapted to be engaged with the forward end of the horseshoe, two clamping-arms adapted at their rear ends to grip the outer edges of the rear ends of the horseshoe and connected with the locating-plate so as to be spread apart or drawn together when moved rearwardly or forwardly relative thereto, a coupling-head uniting the forward ends of the said arms and formed with an operating-stem, and an operating-screw mounted in the pad in which it is held against longitudinal movement and coacting with the said stem.

3. In a removable horseshoe-pad, the combination with the pad proper, of a locating-plate having the said pad connected with it and adapted to fit within the horseshoe, a hook attached to the said plate and adapted to be engaged with the forward end of the horseshoe, two clamping-arms adapted at their rear ends to grip the outer edges of the rear ends of the horseshoe and connected with the said locating-plate so as to be spread apart or drawn together when moved rearwardly or forwardly relative thereto, a coupling-head uniting the forward ends of the said arms and formed with an internally-threaded tubular operating-stem, the said head being connected with the shank of the said hook, and an operating-screw mounted in the pad, held against longitudinal movement and entering the said stem through which it operates to move the arms back and forth.

In testimony whereof I have signed this specification in the presence of two subscribing witnesses.

DANIEL J. CUMMINGS.

Witnesses:
GEO. D. SEYMOUR,
FRED C. EARLE.